United States Patent [19]

Mahlab

[11] 3,732,368

[45] May 8, 1973

[54] SURVEILLANCE UNIT FOR SCANNING AN AREA UNDER SURVEILLANCE

[75] Inventor: Salim S. Mahlab, Hackensack, N.J.

[73] Assignee: Telesphere Technology, Inc., Hackensack, N.J.

[22] Filed: Apr. 23, 1971

[21] Appl. No.: 136,737

[52] U.S. Cl. ............................178/7.81, 178/DIG. 38

[51] Int. Cl. ................................................H04n 5/00

[58] Field of Search ......................178/7.81, 7.9, 7.91, 178/DIG. 38; D26/14.4; D61/14.4; 95/15; 181/26

[56] References Cited

UNITED STATES PATENTS

| | | | |
|---|---|---|---|
| 3,535,442 | 10/1970 | Jennings | 178/DIG. 38 |
| 3,258,595 | 6/1966 | Galante | 178/DIG. 38 |
| D203,678 | 2/1966 | Newton et al. | 178/DIG. 38 |

*Primary Examiner*—Robert L. Griffin
*Assistant Examiner*—George G. Stellar
*Attorney*—Robert L. Nathans

[57] ABSTRACT

A generally spherical surveillance unit is disclosed which is supported from the ceiling by a vertically oriented surveillance unit support shaft which rotates the entire surveillance unit in the panning mode either manually or automatically and which supports the weight of the surveillance unit. A TV camera or other surveillance subunit is coupled to a tilting motor which is mounted inside a spherical enclosure and which in turn is supported by the support shaft. The tilting motor tilts the camera along with the spherical enclosure surrounding the surveillance unit to provide for tilting of the unit along with panning of the unit for maximum coverage. The entire unit is "mod" in appearance and is unobtrusive in the performance of its scanning functions.

20 Claims, 3 Drawing Figures

SALIM S. MAHLAB
INVENTOR.
BY
Robert L. Mathews
ATTORNEY.

SALIM S. MAHLAB
INVENTOR.
BY
ATTORNEY.

SURVEILLANCE UNIT FOR SCANNING AN AREA UNDER SURVEILLANCE

BACKGROUND OF THE INVENTION

This invention relates to the field of surveillance units which continually scan an area under surveillance.

Surveillance systems for panning and tilting a surveillance subunit such as a TV camera are known in the art.

In U. S. Pat. No. 3,437,753 of Stith, a television camera is coupled to a vertically oriented drive shaft which is rotated by a panning motor to cause the camera to pan in a horizontal plane. A crankshaft arrangement is coupled between the camera housing and a tilting motor to cause the camera to tilt or nod back and forth in a vertical plane. Limit switches are utilized to limit the panning movement of the camera by reversing the direction of rotation of the panning motor drive shaft.

U. S. Pat. No. 3,535,442 of Jennings, discloses a TV camera positioned within an enclosure which is suspended from the ceiling by a vertically oriented shaft which is in turn rotated by a panning motor to effect panning. No provision for tilting is taught by the Jennings patent.

While a surveillance unit similar to the unit disclosed by Stith may theoretically be utilized to scan an area under surveillance in both the tilting and panning modes, the motions of the camera would be visually apparent to individuals under surveillance and would be obtrusive and would create nervousness among at least a significant portion of such individuals. These reactions would in turn result in the loss of customers which is of course highly undesirable in the case of a retail store for example. Furthermore, since any undisguised camera can readily indicate the direction of view even to an inexperienced person, a wrongdoer can easily avoid it by operating outside the field of view. This condition is eliminated by a feature of my invention since the direction of view is not visually detectable. The spherical enclosure of the present invention has two or more viewing ports which are identical and mounted upon widely separated portions of the enclosure, and each port appears identical. Thus the camera could be "looking through" any of the ports, thus acting as an effective deterrent. Furthermore, in certain locations, such as warehouses, an exposed camera or any other type of surveillance unit would be prone to damage through intentional mischief or vandalism. Through the use of the spherical housing, this invention provides added physical protection to the equipment. Additionally, it is important to provide a compact, inexpensive and above all attractive surveillance unit.

Thus, the unit should be constructed so as to reduce the apparent, observable tilting and scanning motions to in turn minimize self-consciousness among persons under surveillance. Additionally, the unit should be compact, attractive to the eye, and not have the appearance of a piece of clumsy machinery. With a view toward these objects, I have invented a surveillance unit which may be inexpensively manufactured, and may utilize lightweight spherical enclosures which do not support the weight of the viewing device and its associated driving mechanisms. Colored plastic enclosures would be quite desirable. I have provided a compact, attractive, spherical surveillance unit which is typically suspended from the ceiling by means of a single rotatable shaft, and yet operates in both the tilting and panning modes. It is desirable to provide ventilation of the surveillance unit in a highly economical manner which preferably eliminates cooling fans.

SUMMARY OF A PREFERRED EMBODIMENT OF THE INVENTION

In accordance with a preferred embodiment of the present invention, a surveillance subunit, which is typically a TV camera, is suspended from a tilting motor which in turn is suspended from a vertically oriented shaft which rotates to pan the TV camera. The camera is tilted by the actuation of the tilting motor while the surveillance unit is panned. A lightweight, attractive, spherical enclosure substantially surrounds the surveillance unit and is rigidly coupled thereto so that the spherical enclosure is panned and tilted along with the TV camera and only need support its own weight. The camera is tilted about a pivot axis which is centrally located with respect to the spherical enclosure so that as the entire surveillance unit tilts, it does not appear to be moving to any large extent. Since the panning motion is about the vertically oriented rotatable shaft, which is centrally positioned with respect to the spherical enclosure, the appearance of panning motion is also minimized. Cooling may be effected by providing an orifice within the upper portion of the sphere which also functions to permit tilting of the sphere.

Other objects, features and advantages of the present invention will become apparent upon the perusal of the following specifications taken in conjunction with the drawings in which:

FIG. 2 illustrates a side view of the surveillance unit while:

DETAILED DESCRIPTION OF THE PREFERRED EMBODIMENT

Figure 1:
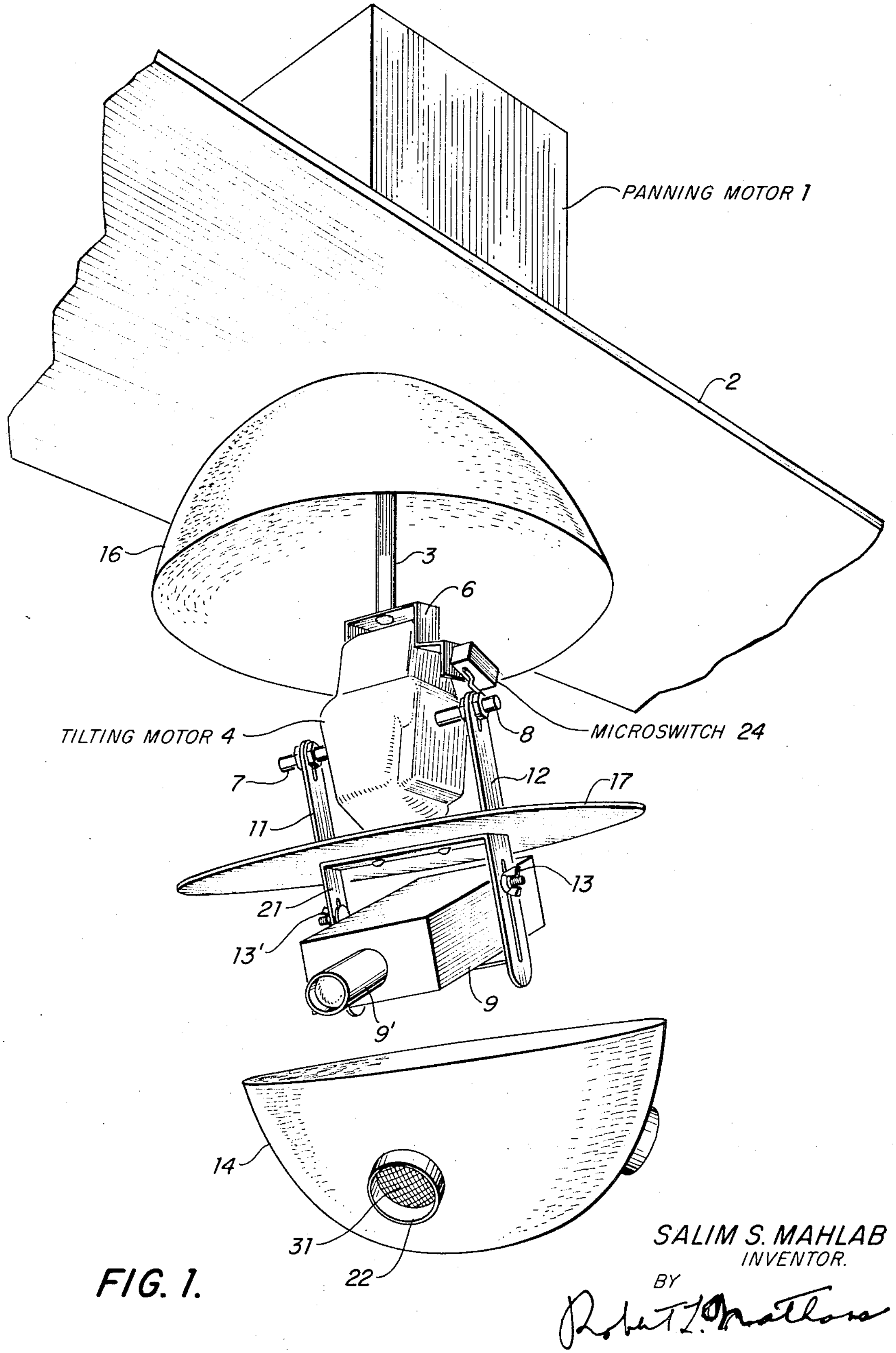
FIG. 1 illustrates an exploded view of the surveillance unit.

In FIG. 1, panning motor 1 is positioned above ceiling member 2 and is supported thereby. A vertically oriented drive shaft 3, coupled to panning motor 1, passes through the ceiling and is mechanically coupled to tilting motor 4 via tilting motor support member 6, which supports the weight of the surveillance unit and provides for rotation of the unit in the panning mode. Tilting motor 4 has a pair of drive shafts 7 and 8 extending from opposite sides of the tilting motor as shown. Surveillance subunit 9, which would typically comprise a TV camera, is supported by subunit support means which consist of elongated arms 11 and 12 which are coupled to surveillance subunit 9 by wing nuts 13 and 13'. Arms 11 and 12 are also coupled to drive shafts 7 and 8 by means of conventional nuts as illustrated. It should be understood that while the surveillance subunit 9 is illustrated as a TV camera, the subunit could comprise virtually any device for viewing or detecting a condition within the surveillance area which is to be monitored. For example, subunit 9 could consist of a smoke or heat sensor, an ultra-sonic intrusion sensor, a remotely controlled film time lapse camera, or a wireless battery operated microphone.

The substantially spherical housing includes hollow hemispheres 14 and 16 which are bolted or otherwise affixed to a disc member 17, which in turn is rigidly coupled to arms 11 and 12 by means of bracket 21. Bracket 21 is utilized to rigidly affix arms 11 and 12 to disc 17 so that tilting and panning motions of the interior components of the surveillance unit will be transmitted to the spherical enclosure, thereby to maintain substantial alignment between the viewing axis of surveillance subunit 9 and viewport 22 formed within the spherical enclosure as illustrated. The viewport may employ a screen having light transmitting orifices 31.

The electrical cables associated with the TV camera 9 and the tilting motor pass through orifice 23 (shown in FIGS. 2 and 3) formed at the upper position of the spherical enclosure and pass through the ceiling to be connected to signal processing and power supply circuitry, not shown, which form no part of the present invention.

Wing nuts 13 and 13' are loosened and the camera viewing axis is substantially aligned with viewport 22 before assembling. Hemispheres 14 and 16 are thereafter bolted to support disc 17.

Figure 2:
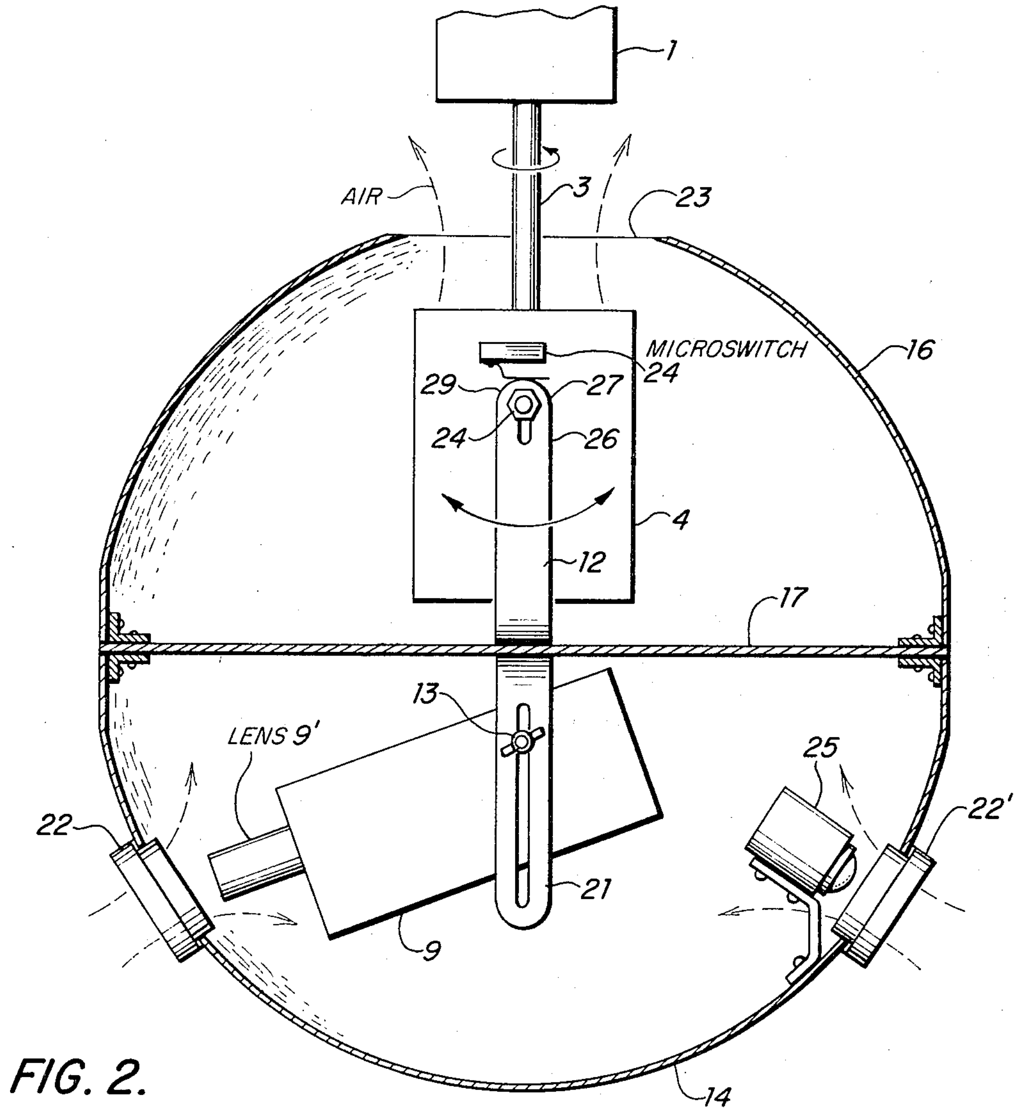
Figure 3:
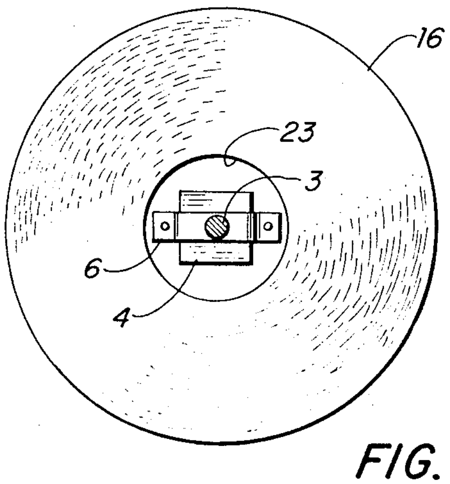
FIG. 3 illustrates a top view of the unit.

The actuation of panning motor 1 causes rotation of the surveillance unit support shaft 3 which in turn causes the entire surveillance unit to pan in the horizontal mode. A conventional microswitch 24 is positioned adjacent the rounded upper portion 26 of camera support arm 12 as shown in FIG. 2. Power is applied to the tilting motor and the support arms, driven by drive shafts 7 and 8, continue to tilt camera 9 until limit switch 24 is closed by the rounded cam portion 27 of arm 12. This action causes the tilting motor to reverse direction and to drive the camera upwardly until rounded cam portion 29 of arm 12 again actuates limit switch 24, to in turn again reverse the direction of tilting motion. The control circuitry for performing this function forms no part of the present invention and is thus excluded in the interest of clarity. Such circuitry is obvious to one skilled in the art and is disclosed in U. S. Pat. No. 3,164,838 among others. Since the spherical housing is rigidly coupled to the internal components of the surveillance unit by disc 17 and bracket 21, the entire housing will pan and be tilted along with the panning and tilting motions of subunits 9, to thus maintain alignment of the viewing device 9 with viewport 22.

It is important to note that the arm pivot points 24 located at the tilting motor drive shafts are positioned at a relatively centrally located interior portion of the spherical enclosure so that the aforementioned tilting of the spherical enclosure will not be highly conspicuous to an observer in the area under surveillance. Orifice 23, which surrounds rotatable surveillance unit support shaft 3, enables the aforementioned tilting by providing adequate clearance at all times between the upper portion 16 of the spherical housing and shaft 3. In addition to this function, orifice 23 also permits cooling convection currents, which pass through perforations 31 of viewport 22 to move through orifice 23 and out of the device Dashed arrows indicate such currents in FIG. 2. Thus heat generated by the components is continually carried out of orifice 23 by virtue of convection currents which enter the housing through perforations 31, which could be formed if desired in other portions of the housing. Problems associated with the use of a fan, such as maintenance and added cost, are thus eliminated.

It is important to note that the substantially spherical enclosure or housing merely supports its own weight and thus may be fabricated of lightweight inexpensive material such as colored plastic, sheet metal, etc. The entire weight of the surveillance unit is carried by the vertically oriented support shaft 3 which also actuates the entire unit in the panning mode. Because of the preferred spherical configuration, the panning and tilting motions will be relatively inconspicuous to an observer in the area under surveillance, unlike the prior art devices. Furthermore the spherical housing is compact and attractive to the eye and thus is readily applicable to scanning of store areas, airports, manufacturing and storage areas, etc.

Since the lens arrangement of TV camera 9 is positioned relatively close to viewport screen 31, the screen will be out of focus and thus will not be imaged on the photosensitive imaging screen of the camera.

A searchlight 25 may be positioned adjacent viewport 22' and may be illuminated at night to deter intrusion or may be illuminated during store hours for producing decorative effects.

Other embodiments will occur to those skilled in the art and are within the following claims.

What is claimed is:

1. A surveillance unit comprising:

an elongated surveillance unit support means;

a surveillance subunit for examining an area under surveillance;

a surveillance subunit support means coupled between said surveillance subunit and said surveillance unit support means for supporting said surveillance subunit;

a tilting motor for tilting said surveillance subunit in a first direction to increase the surveillance capability thereof;

a panning motor for causing said surveillance subunit to pan in a second direction transverse to said first direction;

an enclosure substantially surrounding said surveillance subunit, said tilting motor, and said surveillance subunit support means; and enclosure support means for supporting said enclosure and for causing said enclosure to move along with said surveillance subunit in said first and second directions to minimize the appearance of tilting and panning motions of said surveillance unit to an observer present in said area under surveillance.

2. The combination as set forth in claim 1 wherein said enclosure is substantially spherical to further minimize the appearance of motion of said surveillance unit.

3. The combination as set forth in claim 1 wherein said enclosure has a cutout positioned adjacent said elongated support means for permitting said enclosure to tilt in response to the actuation of said tilting motor notwithstanding the presence of said elongated surveillance unit support means.

4. The combination as set forth in claim 3 further including air passages formed within a portion of said enclosure remote from said cutout for permitting air currents to pass through said passages and said cutout to cool the interior of said enclosure.

5. The combination as set forth in claim 3 wherein said enclosure is substantially spherical to further minimize the appearance of motion of said surveillance unit.

6. The combination as set forth in claim 1 wherein said surveillance subunit support means is rotatably coupled to said tilting motor at a point centrally positioned with respect to the interior of said enclosure thereby to minimize enclosure motion during the actuation of said tilting motor.

7. The combination as set forth in claim 6 wherein said enclosure support means is directly and rigidly coupled to said surveillance subunit support means to provide for tilting of said enclosure during actuation of said tilting motor and panning of said enclosure during actuation of said panning motor.

8. The combination as set forth in claim 7 wherein said enclosure has a substantially spherical shape.

9. The combination as set forth in claim 8 wherein said enclosure support means comprises a disc affixed to the inner surface of said enclosure, said disc having means associated therewith for rigidly coupling said disc to said subunit.

10. The combination as set forth in claim 1 further including a searchlight positioned within said enclosure for illuminating said area under surveillance.

11. The combination as set forth in claim 1 wherein an active viewport is positioned within said enclosure at a first portion thereof substantially aligned with said surveillance subunit and another viewport is positioned within said enclosure at a portion thereof widely separated from said first portion so that an observer in the area under surveillance cannot ascertain the field of view of said surveillance subunit.

12. A surveillance unit comprising:

- a rotatable elongated surveillance unit support means for supporting said surveillance unit;
- a surveillance subunit coupled to said elongated surveillance unit support means for examining said area under surveillance;
- a substantially spherical housing substantially surrounding said surveillance subunit;
- means for rotating said elongated surveillance unit support means for panning said surveillance subunit;
- means for tilting said surveillance subunit to increase the surveillance capability of said surveillance subunit;
- means for rigidly coupling said substantially spherical housing to said surveillance subunit for causing said spherical housing to tilt and pan along with said surveillance subunit.

13. The combination as set forth in claim 12 wherein said substantially spherical housing includes a cutout formed therein adjacent said elongated rotatable surveillance unit support means for permitting tilting of said housing with respect to said elongated rotatable surveillance unit support means.

14. The combination as set forth in claim 13 further including air passages formed within a portion of said enclosure remote from said cutout for permitting air currents to pass through said passages and said cutout to cool the interior of said enclosure.

15. The combination as set forth in claim 13 wherein an active viewport is positioned within said enclosure at a first portion thereof substantially aligned with said surveillance subunit and another viewport is positioned within said enclosure at a portion thereof widely separated from said first portion so that an observer in the area of surveillance cannot ascertain the field of view of said surveillance subunit.

16. A surveillance unit suspended from a ceiling of an area under surveillance comprising:

- a panning motor;
- an elongated, vertically oriented, rotatable surveillance unit support shaft rotated by said panning motor;
- a tilting motor having a first and second drive shaft extending from opposite sides of said tilting motor;
- tilting motor support means coupled between said tilting motor and said rotatable surveillance unit support shaft for causing said vertically oriented support shaft to support the weight of said tilting motor;
- a surveillance subunit for examining an area under surveillance;
- first and second surveillance subunit support means coupled between said surveillance subunit and said first and second tilting motor drive shafts for producing tilting of said surveillance subunit upon the rotation of said drive shafts;
- a substantially spherical enclosure substantially surrounding said surveillance subunit and said tilting motor, and;
- means for rigidly coupling said spherical enclosure to said surveillance unit for causing said enclosure to pan along with rotation of said vertically oriented surveillance unit support shaft and to tilt along with the tilting of said surveillance subunit, thereby to provide a substantially spherical surveillance unit which minimizes the appearance of tilting and panning motions of said subunit to an observer present in an area under surveillance.

17. The combination set forth in claim 16 wherein a first viewport is positioned within said spherical enclosure, said first viewport being aligned with a viewing axis of said surveillance subunit, and a second viewport is positioned within said enclosure at a portion thereof remote from said first viewport so that an observer within said area under surveillance cannot ascertain whether he is in the field of view of said surveillance subunit.

18. The combination set forth in claim 17 wherein a cutout is included within the upper portion of said spherical enclosure and which surrounds said vertically oriented surveillance unit support shaft to provide for tilting of said spherical enclosure without interference of said support shaft.

19. The combination as set forth in claim 18 further including air passages formed within a portion of said enclosure remote from said cutout for permitting air currents to pass through said passages and said cutout to cool the interior of said enclosure.

20. The combination as set forth in claim 16 wherein said drive shafts of said tilting motor are centrally located with respect to said spherical enclosure so that said subunit and said enclosure tilts about an axis centrally located with respect to said spherical enclosure.

* * * * *